(12) United States Patent
Zaike et al.

(10) Patent No.: US 9,279,450 B2
(45) Date of Patent: Mar. 8, 2016

(54) STRUCTURE OF BUSH BEARING (71) Applicant: Showa Corporation, Gyoda-shi (JP)

(72) Inventors: Yasuhiro Zaike, Haga-gun (JP); Yusuke Hamaguchi, Haga-gun (JP); Tsutomu Kimijima, Haga-gun (JP); Tatsuya Saito, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/444,507

(22) Filed: Jul. 28, 2014

(65) Prior Publication Data
US 2015/0204381 A1 Jul. 23, 2015

(30) Foreign Application Priority Data
Jan. 23, 2014 (JP) ................................. 2014-010276

(51) Int. Cl.
| | |
|---|---|
| *F16C 27/06* | (2006.01) |
| *F16C 29/02* | (2006.01) |
| *B62D 3/12* | (2006.01) |
| *F16H 19/04* | (2006.01) |
| *F16C 29/00* | (2006.01) |
| *F16C 33/20* | (2006.01) |
| *F16C 35/02* | (2006.01) |

(52) U.S. Cl.
CPC ............... *F16C 27/063* (2013.01); *B62D 3/12* (2013.01); *F16C 29/002* (2013.01); *F16C 29/02* (2013.01); *F16C 33/20* (2013.01); *F16H 19/04* (2013.01); *F16C 35/02* (2013.01); *F16C 2326/24* (2013.01); *F16C 2361/61* (2013.01)

(58) Field of Classification Search
CPC ...... F16C 29/02; F16C 35/10; F16C 2326/24; F16C 43/02; F16C 27/06; F16C 27/063; F16C 33/046; F16C 33/20; F16C 29/002; F16C 35/02; F16C 2361/61; F16H 19/04; B62D 3/12; B62D 5/0442; Y10T 74/216; Y10T 74/18088; Y10T 74/18096
See application file for complete search history.

(56) References Cited

U.S. PATENT DOCUMENTS

| | | | | |
|---|---|---|---|---|
| 6,485,180 | B2 * | 11/2002 | Mena | 384/222 |
| 7,220,056 | B2 * | 5/2007 | Kubota et al. | 384/215 |
| 7,665,747 | B2 * | 2/2010 | Arlt | 280/93.514 |

(Continued)

FOREIGN PATENT DOCUMENTS

| | | |
|---|---|---|
| EP | 1394426 A | 3/2004 |
| EP | 2202129 A | 6/2010 |
| JP | 2007-009962 A | 1/2007 |

OTHER PUBLICATIONS

Search Report mailed Jan. 22, 2015 for the corresponding UK Application No. 1413516.4.

*Primary Examiner* — Alan B Waits
(74) *Attorney, Agent, or Firm* — Leason Ellis LLP (57) ABSTRACT

A structure of a bush bearing includes: a bush on which a groove is formed; and an endless annular-shaped elastic member which is installed in the groove of the bush, and that supports a rack shaft, in which an inner circumferential surface of the bush includes a first inner circumferential surface that is in slide contact with an outer circumferential surface of the rack shaft, which is positioned opposite to a formation position of rack teeth, a second inner circumferential surface that faces the outer circumferential surface of the rack shaft with a gap interposed between the outer circumferential surface and the second inner circumferential surface, and the groove formed in a formation range of the first inner circumferential surface has a depth shallower than that of the groove formed in a formation range of the second inner circumferential surface.

3 Claims, 5 Drawing Sheets

(56) References Cited

U.S. PATENT DOCUMENTS

| | | |
|---|---|---|
| 7,798,504 B2 * | 9/2010 | Hirose et al. ............. 280/93.514 |
| 8,272,785 B2 * | 9/2012 | Hirose et al. ................. 384/215 |
| 8,418,583 B2 * | 4/2013 | Oki et al. ........................ 74/594 |
| 8,429,991 B2 * | 4/2013 | Kim et al. .................... 74/89.17 |
| 8,696,207 B2 * | 4/2014 | Tange et al. ................... 384/215 |
| 2015/0020618 A1 * | 1/2015 | Kawakubo ........................ 74/30 |

\* cited by examiner

STRUCTURE OF BUSH BEARING

CROSS-REFERENCE TO RELATED APPLICATIONS

This application is based on and claims priority under 35 USC 119 from Japanese Patent Application No. 2014-010276 filed on Jan. 23, 2014, the entire content of which is incorporated herein by reference.

BACKGROUND OF THE INVENTION

1. Technical Field

The present invention relates to a structure of a bush bearing.

2. Related Art

In a rack and pinion steering apparatus, a rack shaft with rack teeth, which meshes with teeth of a pinion, is movably supported via a bush bearing by a gear housing. Various synthetic resin-made bush bearings are proposed as the bush bearing. Typically, the synthetic resin-made bush bearing has a tightening margin with respect to the rack shaft, and movably supports the rack shaft.

When the bush bearing has a large tightening margin with respect to the supported rack shaft, the bush bearing can support the rack shaft so as to maintain a predetermined rigidity in a radial direction. However, when the rack shaft is tightened too much, the rack shaft has a high sliding frictional resistance, and thus is unlikely to slide. In contrast, when the bush bearing has a small tightening margin with respect to the supported rack shaft, the rack shaft has a low sliding frictional resistance, and has satisfactory moving characteristics. However, the rack shaft is likely to have a large center offset, or a gap or the like is likely to occur between the bush bearing and the rack shaft. In addition, the rigid support in the radial direction weakens, and when the rack shaft moves, rattle noise (gear rattle noise) is caused to occur between the teeth of the pinion and the rack teeth.

A gap between the synthetic resin-made bush bearing and the rack shaft is caused to occur by stress relief in association with creep deformation and thermal history of the synthetic resin. Accordingly, the rigid support in the radial direction weakens, and rattle noise (gear rattle noise) occurs. In particular, when radial contraction is caused to occur by the stress relief of the synthetic resin, the synthetic resin-made bush bearing has an increasing tightening margin with respect to the rack shaft, and the sliding frictional resistance becomes high. When a bush supports the entire circumference of the rack shaft, the rack teeth and the bush interfere with each other, and the bush is cut.

Patent Literature 1 (JP-A-2007-9962) discloses the bush that has a concave-shaped or a flat-shaped inside inner circumferential surface; an outside inner circumferential surface which is disposed on an outside in the radial direction farther than the inside inner circumferential surface; and a slit which is provided so as to correspond to the inside inner circumferential surface, and the bush bearing that is made of an endless annular-shaped elastic member installed in a circumferential groove of the bush. Since the bush bearing made of the endless annular-shaped elastic member is installed in the circumferential groove of the bush, the bush bearing can support the rack shaft so as to maintain predetermined rigidity in the radial direction and a direction in which the bush bearing departs from the teeth of the pinion, and the inside inner circumferential surface can prevent external disturbance from causing displacement of the bush bearing toward an opposite direction of the rack teeth of the rack shaft. The bush bearing has a low frictional resistance in a movement in an axial direction of the rack shaft, and can movably support the rack shaft. In addition, a gap is formed between the outside inner circumferential surface and an outer circumferential surface of the rack shaft, on which the rack teeth are formed. An impact of the stress relief in association with the creep deformation and the thermal history can be reduced.

SUMMARY OF THE INVENTION

As disclosed in Patent Literature 1, when the synthetic resin-made bush bearing has a gap provided between the rack teeth of the rack shaft and the inner circumferential surface of the bush, the entirety of the rack shaft can avoid a state of being strongly tightened, and can be slidably supported with a low frictional resistance. A problem is solved in which the bush is cut by the rack teeth. However, since a range of the gap is greater than or equal to 180°, it is not possible to regulate an offset of the rack shaft from its position caused by an external force exerted on the rack teeth of the rack shaft. Accordingly, the rack shaft bends toward the gap, is offset from its position, and is brought into contact with a gear housing.

Since the technology disclosed in Patent Literature 1 has a structure in which a gap is provided between the housing and the endless annular-shaped elastic member, the gear housing has a large inner diameter to that extent, and the size and the weight of the gear housing increase.

The present invention is made to solve the problem, and an object of the present invention is to provide a structure of a bush bearing in which a rack shaft is prevented from being offset from its position toward a direction in which rack teeth are formed, and the size of a gear housing is reduced.

According to an aspect of the present invention to solve the problem, there is provided a structure of a bush bearing including: a bush on which a groove is formed along a circumferential direction in an outer circumferential surface of the bush; and an endless annular-shaped elastic member which is installed in the groove of the bush, and that supports a rack shaft in such a manner that the rack shaft is slidable relative to a gear housing, in which an inner circumferential surface of the bush includes a first inner circumferential surface and a second inner circumferential surface, the first inner circumferential surface is formed over an angular range greater than 180° about an axial center of the bush, and is in slide contact with an outer circumferential surface of the rack shaft, which is positioned opposite to a formation position of rack teeth formed on the rack shaft, the second inner circumferential surface has a diameter larger than that of the first inner circumferential surface, and faces the outer circumferential surface of the rack shaft with a gap interposed between the outer circumferential surface and the second inner circumferential surface, the groove formed in a formation range of the first inner circumferential surface has a depth shallower than that of the groove formed in a formation range of the second inner circumferential surface, and in a state where a portion of the endless annular-shaped elastic member, which is positioned opposite to the formation position of the rack teeth has a radial deformation margin larger than that of a portion of the endless annular-shaped elastic member, which is positioned at the formation position of the rack teeth, the endless annular-shaped elastic member is in close contact with an inner circumferential surface of the gear housing.

According to the structure of the bush bearing, the first inner circumferential surface in contact with the outer circumferential surface of the rack shaft is formed over the angular range greater than 180° about the axial center of the bush, and thus an external force or the like is not allowed to cause the rack shaft to be offset from its position toward the second inner circumferential surface that is separated from the rack shaft by a gap.

In a state where the portion of the endless annular-shaped elastic member, which is positioned opposite to the formation position of the rack teeth, has a radial deformation margin larger than that of the portion of the endless annular-shaped elastic member, which is positioned at the formation position of the rack teeth, the endless annular-shaped elastic member is in close contact with the inner circumferential surface of the gear housing. Accordingly, a portion of the bush in the formation range of the first inner circumferential surface is strongly pushed against the inner circumferential surface of the gear housing rather than a portion of the bush in the formation range of the second inner circumferential surface being pushed against the inner circumferential surface of the gear housing. As a result, it is possible to increase not only the strength of the bush for supporting the gear housing in the formation range of the first inner circumferential surface, but also the strength of the bush for supporting the rack shaft in slide contact with the first inner circumferential surface.

Due to the formation of the groove, the strength of the bush is likely to decrease in the formation range of the second inner circumferential surface that has a wall thickness smaller than that of the first inner circumferential surface by a dimension of the gap. However, the groove formed in the formation range of the second inner circumferential surface has a large groove depth, and thus it is possible to prevent an excessive deformation of the bush in the formation range of the second inner circumferential surface.

Since the gap is present between the rack teeth and the second inner circumferential surface, the rack teeth and the bush do not interfere with each other.

Since the structure is adopted in which the endless annular-shaped elastic member is in close contact with the inner circumferential surface of the gear housing, there is no gap present between the endless annular-shaped elastic member and the gear housing as described in Patent Literature 1. Accordingly, to that extent, it is possible to reduce the size of the gear housing, and to prevent the weight of the gear housing from increasing.

According to the aspect of the present invention, the structure of the bush bearing may have a configuration in which, a slit is formed along a direction of an axial center of the bush so as to open at an end portion of the bush in the direction of the axial center of the bush, and the slit is disposed only in the formation range of the first inner circumferential surface in a range of 360° about the axial center of the bush.

According to the structure of the bush bearing, the slit is formed, and thus a sliding area decreases to that extent. Accordingly, it is possible to reduce a sliding resistance and sliding noise, which occur between the outer circumferential surface of the rack shaft and the first inner circumferential surface. Since the slits are formed only in the formation range of the first inner circumferential surface, the slits minimize a decrease in the rigidity of the second inner circumferential surface that has a wall thickness smaller than that of the first inner circumferential surface by a dimension of the gap. Accordingly, it is possible to prevent an excessive deformation of the bush in the formation range of the second inner circumferential surface, which is caused when the bush receives an elastic deformation force of the endless annular-shaped elastic member.

According to the aspect of the present invention, it is possible to prevent the rack shaft from being offset from its position toward a direction in which the rack teeth are formed. The size of the gear housing is reduced, and the weight of the gear housing is prevented from increasing.

BRIEF DESCRIPTION OF THE DRAWINGS

FIGS. 2A and 2B are views describing a bush of the present invention.

DETAILED DESCRIPTION OF THE INVENTION

For example, a structure of a bush bearing according to the present invention is applied to a rack and pinion steering apparatus for a four wheeled vehicle. The rack and pinion apparatus includes a pinion (not illustrated) connected to a steering wheel which is operated by a driver, and a rack shaft 1 (refer to FIG. 4) on which rack teeth 1A is formed so as to mesh with teeth of the pinion. Each end of the rack shaft 1 is connected to a wheel (not illustrated) via a tie rod. A bush bearing 2 serves to support the rack shaft 1 in such a manner that the rack shaft 1 is slidable relative to a gear housing 3.

Figure 1:
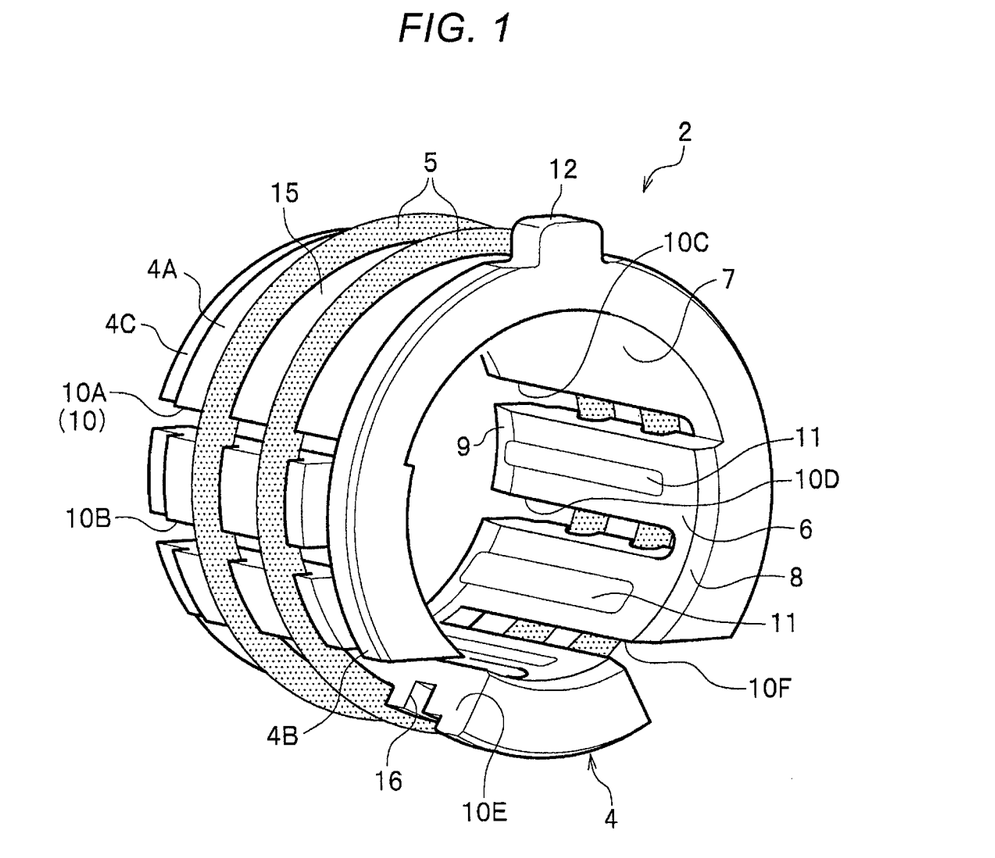
FIG. 1 is a perspective view of an external appearance of a bush bearing of the present invention.
Figure 2A:
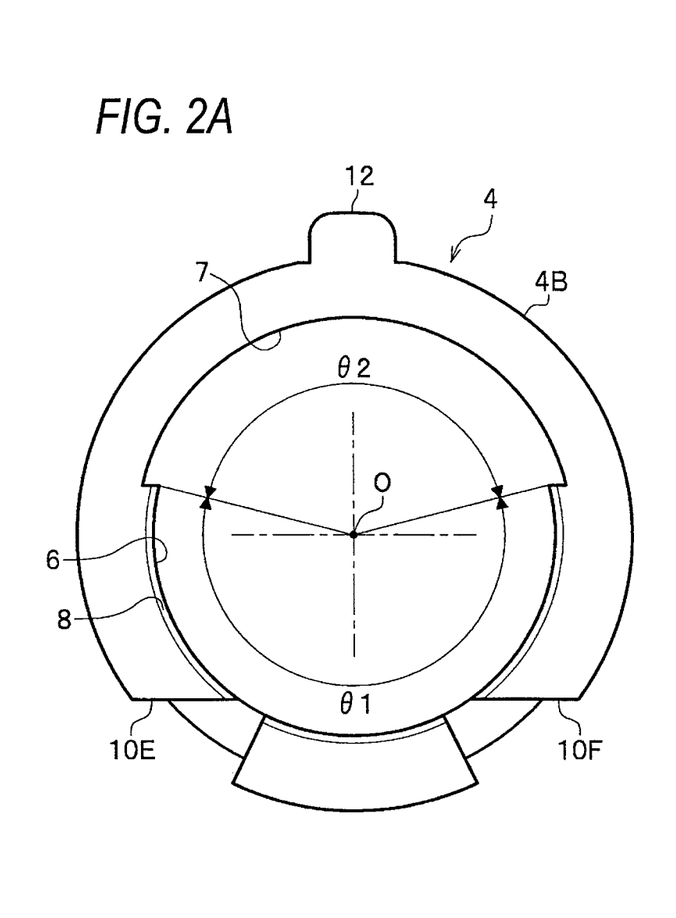
FIG. 2A is a front view of the bush.
Figure 2B:
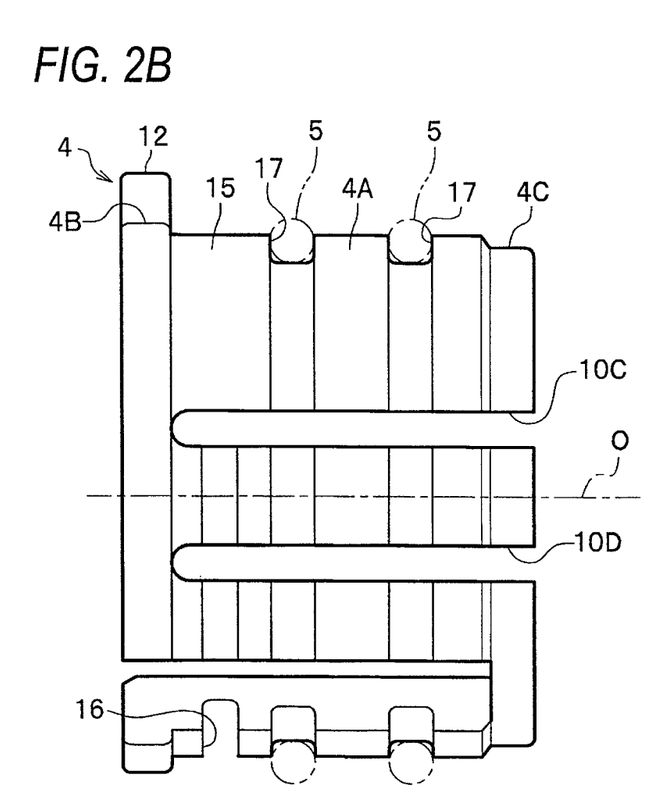
FIG. 2B is a side view of the bush.

In FIGS. 1, 2A, and 2B, the bush bearing 2 is configured to include a bush 4 and two endless annular-shaped elastic members 5. For example, the bush 4 is made of a synthetic resin material. For example, the endless annular-shaped elastic member 5 is an O ring or the like which is made of a rubber material. The bush 4 is a cylindrical member with opposite open ends, and the bush 4 is configured to include a trunk portion 4A that is formed at the center of the bush 4 in an axial direction; a large-diameter portion 4B that is formed on one end of the trunk portion 4A and has an outer diameter larger than that of the trunk portion 4A; and a small-diameter portion 4C that is formed on the other end of the trunk portion 4A and has an outer diameter smaller than that of the trunk portion 4A. Each of the trunk portion 4A, the large-diameter portion 4B, and the small-diameter portion 4C has a circular outer circumferential surface which has the axial center of the bush 4 (an axial center O of the bush) as the center. When the bush bearing 2 is assembled into the gear housing 3, the axial center O of the bush is the same as the axial center of the rack shaft 1 and the axial center of inner circumferential surfaces 13A and 13B (refer to FIG. 4) of the gear housing 3.

Figure 5:
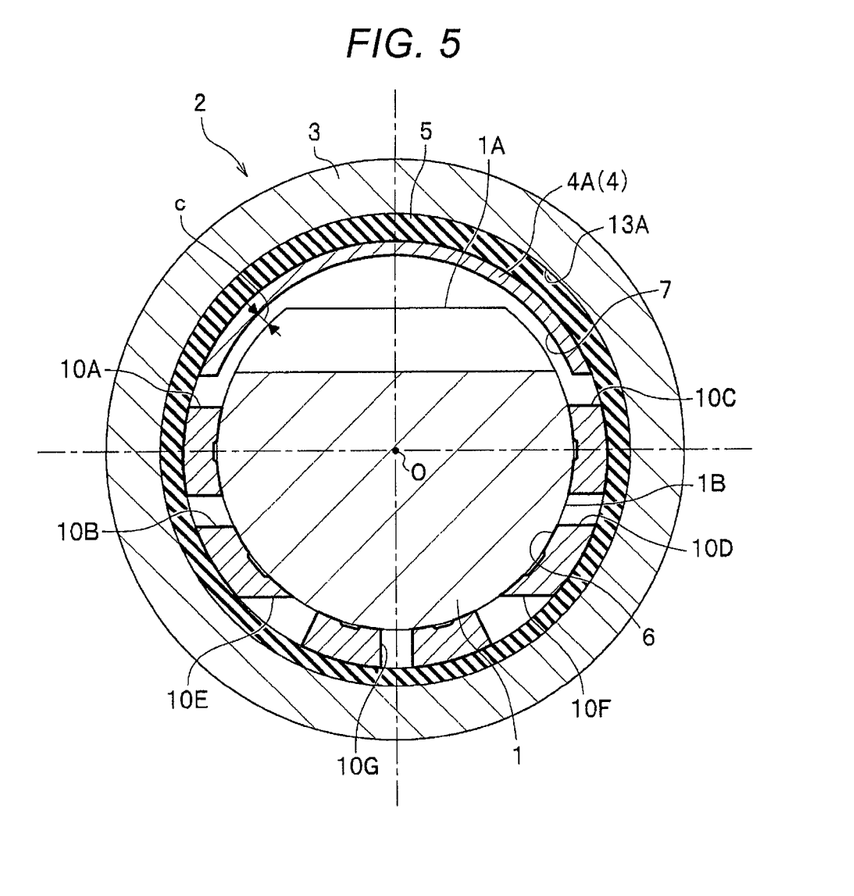
FIG. 5 is a cross-sectional view taken along line V-V in FIG. 4.

An inner circumferential surface of the bush 4 includes a first inner circumferential surface 6 that is formed over an angular range (an angle θ1) greater than 180° about the axial center O of the bush, and is in slide contact with an outer circumferential surface 1B of the rack shaft 1, which is formed at a position opposite to a formation position of the rack teeth 1A; and a second inner circumferential surface 7 that has a diameter larger than that of the first inner circumferential surface 6 so as to avoid interference with the rack teeth 1A, and faces the outer circumferential surface 1B of the rack shaft 1 with a gap c (refer to FIG. 5) interposed between the second inner circumferential surface 7 and the outer circumferential surface 1B. Each of the first inner circumferential surface 6 and the second inner circumferential surface 7 has an arc shape over the entire length of the bush 4 and has the axial center O of the bush as the center. A tapered surface 8 is formed on one end of the first inner circumferential surface 6, and a tapered surface 9 is formed on the other end of each of the first inner circumferential surface 6 and the second inner circumferential surface 7.

Figure 3:
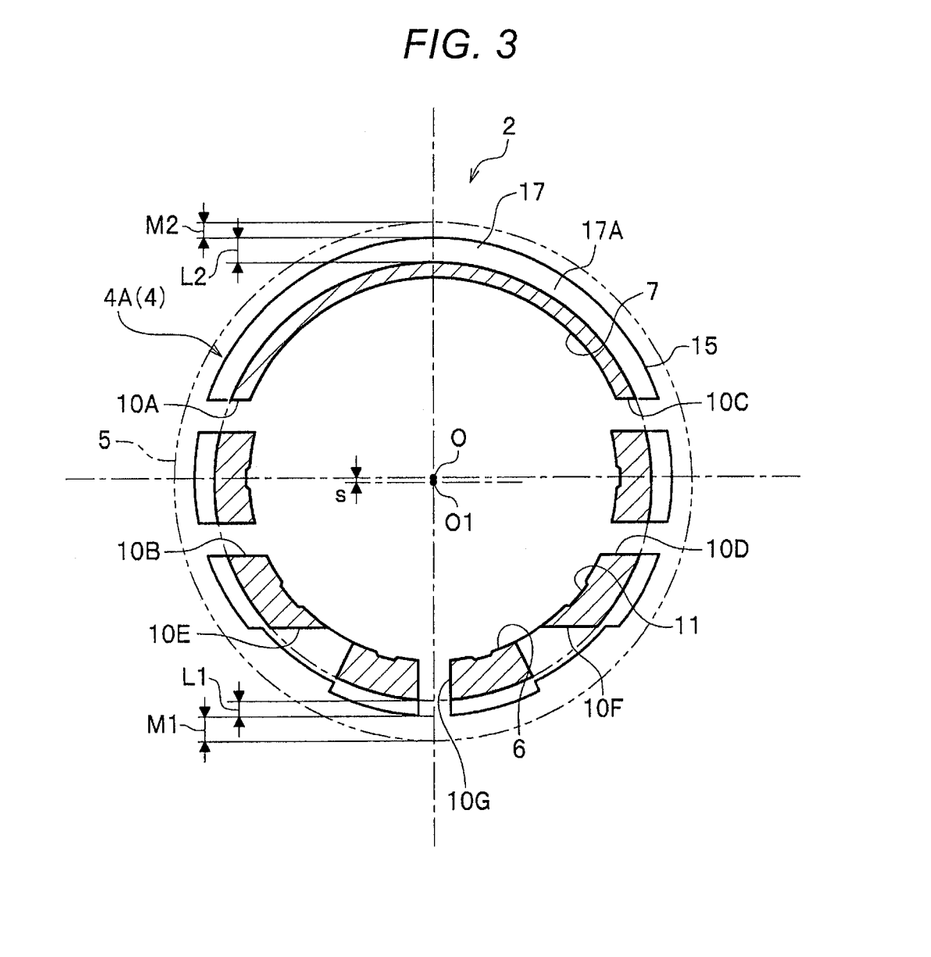
FIG. 3 is a cross-sectional view (an endless annular-shaped elastic member is illustrated by a virtual line) of the bush bearing of the present invention.

A slit 10 is formed along a direction of the axial center O of the bush so as to open at an end portion of the bush 4 in the direction of the axial center O of the bush and to pass through the bush 4 in a radial direction. In the embodiment, as illustrated in FIG. 3, a plurality of slits 10 (10A to 10G) are formed in a circumferential direction so as to be separated from each other. The slits 10A to 10D and the slit 10G are formed so as to open at the other end of the bush 4 (in a portion of the bush 4, in which the small-diameter portion 4C is formed), and the slits 10E and 10F are formed so as to open at one end of the bush 4 (in a portion of the bush 4, in which the large-diameter portion 4B is formed).

In FIG. 3, any one of the slits 10A to 10G is disposed only in a range in which the first inner circumferential surface 6 is formed in a range of 360° about the axial center O of the bush, and no slit is disposed in a range (an angle θ2) in which the second inner circumferential surface 7 is formed (strictly speaking, a part of the slits 10 (the slits 10A and 10C) are disposed in a boundary portion between the first inner circumferential surface 6 and the second inner circumferential surface 7, but in the present invention, it is deemed that the slits 10A and 10C are disposed in the range in which the first inner circumferential surface 6 is formed). The slits 10A to 10D are disposed so as to be close to the second inner circumferential surface 7, and the slits 10A and 10B and the slits 10C and 10D are disposed so as to be bilaterally symmetrical when seen from the direction of the axial center O of the bush. The slits 10E and 10F are disposed so as to be separated from the second inner circumferential surface 7, and are disposed so as to be bilaterally symmetrical when seen from the direction of the axial center O of the bush. The slit 100 is disposed so as to be separated farthest from the second inner circumferential surface 7. The slits 10A to 10D and the slit 10G have a slit width which is constant from an outer circumferential surface of the bush 4 to the first inner circumferential surface 6, and each of the slits 10E and 10F has a slit width which becomes gradually narrower from the outer circumferential surface of the bush 4 to the first inner circumferential surface 6.

As illustrated in FIGS. 1 and 3, a shallow groove 11 is appropriately provided in the first inner circumferential surface 6 so as to have a concave shape along the direction of the axial center O of the bush. A sliding area is caused to decrease by the shallow groove 11, and thus it is possible to reduce a sliding resistance and sliding noise, which occur between the outer circumferential surface 1B of the rack shaft 1 and the first inner circumferential surface 6 without decreasing the strength of the bush 4 for retaining the rack shaft 1.

Figure 4:
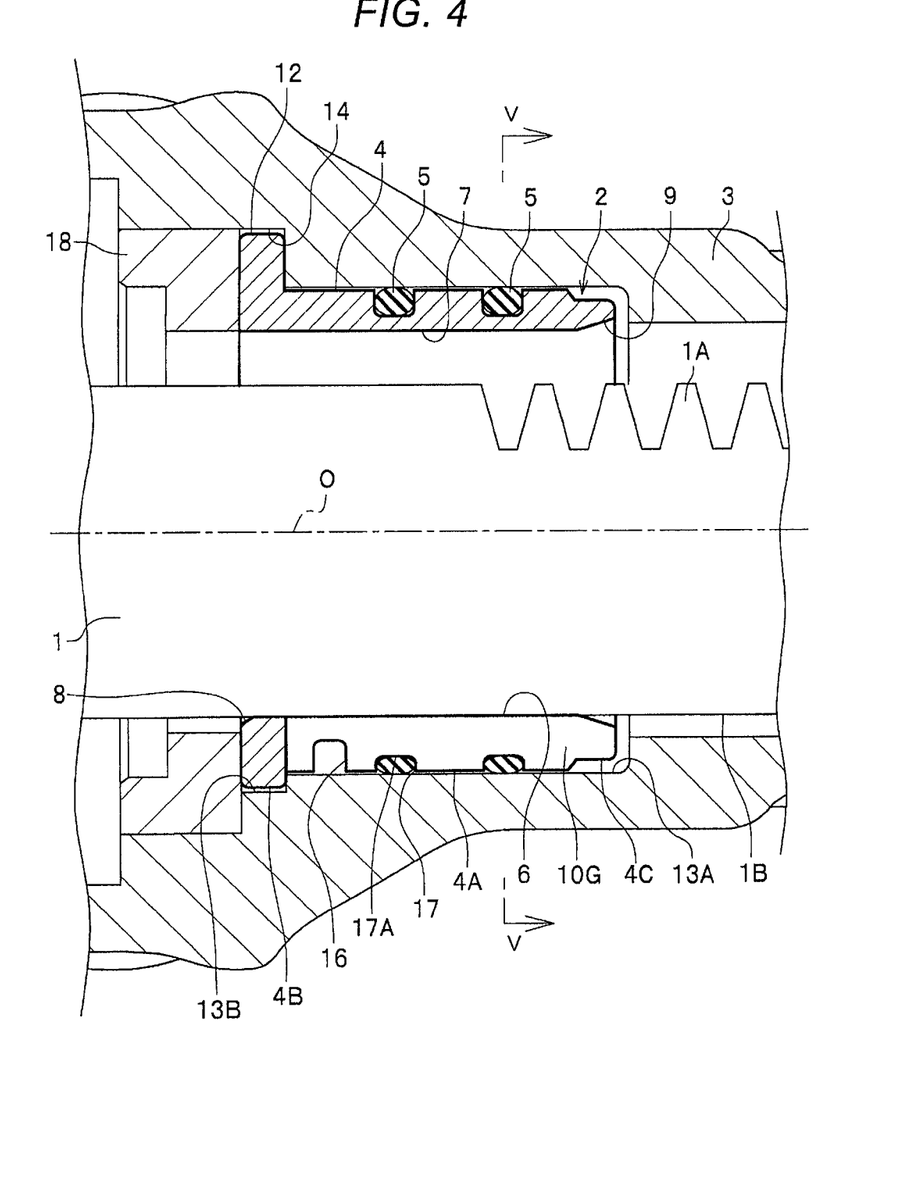
FIG. 4 is a cross-sectional view illustrating a state where the bush bearing is assembled into a gear housing.

As illustrated in FIGS. 1, 2A, and 2B, a positioning protrusion portion 12 is provided on the large-diameter portion 4B of the bush 4 so as to protrude outward in the radial direction. As illustrated in FIG. 4, an inner circumferential surface of the gear housing 3 includes an inner circumferential surface 13A for accommodation of the trunk portion 4A and the small-diameter portion 4C of the bush 4, and an inner circumferential surface 13B for accommodation of the large-diameter portion 4B. A positioning concave portion 14 is provided on the inner circumferential surface 13B so as to have a concave shape, and the positioning protrusion portion 12 sits on the positioning concave portion 14. In the range (the angle θ1) in which the first inner circumferential surface 6 is formed, a concave groove 16 is formed along the circumferential direction in an outer circumferential surface 15 of the trunk portion 4A close to the large-diameter portion 4B. The trunk portion 4A close to the large-diameter portion 4B is caused to have a thin wall thickness by the concave groove 16.

A groove 17 is formed in the circumferential direction in the outer circumferential surface 15 of the trunk portion 4A of the bush 4, and an endless annular-shaped elastic member 5 is installed in the groove 17. In the embodiment, two grooves 17 are formed. The groove 17 formed in the formation range of the first inner circumferential surface 6 has a depth shallower than that of the groove 17 formed in the formation range of the second inner circumferential surface 7. For example, as illustrated in FIG. 3, a groove bottom 17A of the groove 17 has an axial center O1 as the center, which is offset closer to the first inner circumferential surface 6 from the axial center O of the bush by a distance s. Accordingly, the groove 17 formed in the formation range of the first inner circumferential surface 6 has a groove depth L1 shallower than a groove depth L2 of the groove 17 formed in the formation range of the second inner circumferential surface 7. As a result, when the endless annular-shaped elastic member 5 is installed in the groove 17, a dimension M2, by which the endless annular-shaped elastic member 5 protrudes from the outer circumferential surface 15 of the trunk portion 4A positioned in the formation range of the second inner circumferential surface 7 is smaller than a dimension M1, by which the endless annular-shaped elastic member 5 protrudes from the outer circumferential surface 15 of the trunk portion 4A positioned in the formation range of the first inner circumferential surface 6.

Operation

Before the bush bearing 2 is assembled into the gear housing 3, as described above, the dimension M2, by which the endless annular-shaped elastic member 5 protrudes from the outer circumferential surface 15 of the trunk portion 4A positioned in the formation range of the second inner circumferential surface 7 is smaller than the dimension M1, by which the endless annular-shaped elastic member 5 protrudes from the outer circumferential surface 15 of the trunk portion 4A positioned in the formation range of the first inner circumferential surface 6. That is, the endless annular-shaped elastic member 5 does not undergo an elastic deformation, and is positioned in an annular shape so as to have the axial center O1 as the center.

When the bush bearing 2 is inserted into the gear housing 3, resistance occurs between the endless annular-shaped elastic member 5 and the inner circumferential surface 13A of the gear housing 3. However, since the slit 10 is formed along the direction of the axial center O of the bush so as to open at the end portion of the bush 4 in the direction of the axial center O of the bush, the trunk portion 4A split in the circumferential direction by the slits 10 bends in the radial direction, and the bush bearing 2 is smoothly inserted into the gear housing 3. In the embodiment, one end, which is close to the large-diameter portion 4B, of the trunk portion 4A of the bush bearing 2 is caused to have a thin wall thickness by the concave groove 16 illustrated in FIGS. 1 and 4, and thus the bending starts substantially at the thin wall portion, and the other end, which is an insertion tip end, of the trunk portion 4A of the bush bearing 2 is likely to bend in the radial direction. Accordingly, the bush bearing 2 is more smoothly inserted into the gear housing 3.

As illustrated in FIG. 4, when the positioning protrusion portion 12 of the bush 4 sits on the positioning concave portion 14 of the gear housing 3, the bush bearing 2 is located about the axial center O of the bush. Subsequently, when a cover member 18 is attached to the gear housing 3 so as to be in contact with the large-diameter portion 4B of the bush 4, the bush bearing 2 is located in the direction of the axial center O of the bush. A structure in which the cover member 18 is attached to the gear housing 3 is not particularly limited, and a press-fit method, a screw-in method, welding, or the like may be adopted for the attachment.

Subsequently, when the rack shaft 1 is inserted through the bush bearing 2 in order for the rack teeth 1A to face the second inner circumferential surface 7 of the bush 4, assembly of the bush bearing 2 and the rack shaft 1 is completed. After the assembly is completed, the following operation comes into effect.

Since the first inner circumferential surface 6 in contact with the outer circumferential surface 1B of the rack shaft 1 is formed over an angular range (the angle θ1) greater than 180° about the axial center O of the bush, an external force or the like is not allowed to offset the rack shaft 1 from its position toward the second inner circumferential surface 7 that is separated from the rack shaft 1 by the gap c. The angle θ1 is preferably set to be a maximum value insofar as the first inner circumferential surface 6 does not interfere with the rack teeth 1A, for example, the first inner circumferential surface 6 may be formed so as to reach the vicinity of dedendum of the rack teeth 1A.

Before the bush bearing 2 is assembled into the gear housing 3, the endless annular-shaped elastic member 5 has the axial center O1 as the center. After the assembly is completed, the endless annular-shaped elastic member 5 is in close contact with the inner circumferential surface 13A of the gear housing 3, and thus the outer diameter of the endless annular-shaped elastic member 5 is elastically deformed, and the center is positioned at the axial center O of the bush. That is, in a state where a portion of the endless annular-shaped elastic member 5, which is positioned opposite to a formation position of the rack teeth 1A, has a radial compression elastic deformation margin larger than that of a portion of the endless annular-shaped elastic member 5, which is positioned at the formation position of the rack teeth 1A, the endless annular-shaped elastic member 5 is in close contact with the inner circumferential surface 13A of the gear housing 3. Accordingly, a portion of the bush 4 in the formation range of the first inner circumferential surface 6 is strongly pushed against the gear housing 3 rather than a portion of the bush 4 in the formation range of the second inner circumferential surface 7 being pushed against the gear housing 3. As a result, it is possible to increase not only the strength of the bush 4 for supporting the gear housing 3 in the formation range of the first inner circumferential surface 6, but also the strength of the bush 4 for supporting the rack shaft 1 in slide contact with the first inner circumferential surface 6.

Due to the formation of the groove 17 in which the endless annular-shaped elastic member 5 is installed, the strength of the bush 4 is likely to decrease in the formation range of the second inner circumferential surface 7 that has a wall thickness smaller than that of the first inner circumferential surface 6 by a dimension of the gap c. However, in the present invention, the groove 17 has a large groove depth, and thus it is possible to prevent an excessive deformation of the bush 4 in the formation range of the second inner circumferential surface 7.

Since the gap c is present between the rack teeth 1A and the second inner circumferential surface 7, the rack teeth 1A and the bush 4 do not interfere with each other.

Since the slits 10 are formed only in the formation range of the first inner circumferential surface 6, the slits 10 minimize a decrease in the rigidity of the second inner circumferential surface 7 that has a wall thickness smaller than that of the first inner circumferential surface 6 by a dimension of the gap c. Accordingly, it is possible to prevent an excessive deformation of the bush 4 in the formation range of the second inner circumferential surface 7, which is caused when the bush 4 receives an elastic deformation force of the endless annular-shaped elastic member 5.

According to the present invention as described above, the first inner circumferential surface 6 in slide contact with the rack shaft 1 is formed over the angular range greater than 180° about the axial center O of the bush, and thus an external force or the like is not allowed to cause the rack shaft 1 to be offset from its position toward the second inner circumferential surface 7. Since the structure is adopted in which the endless annular-shaped elastic member 5 is in close contact with the inner circumferential surface 13A of the gear housing 3, there is no gap present between the endless annular-shaped elastic member and the gear housing as described in Patent Literature 1. Accordingly, to that extent, it is possible to reduce the size of the gear housing 3, and to prevent the weight of the gear housing 3 from increasing. Furthermore, the slit 10 is formed, and thus the sliding area decreases to that extent. Accordingly, it is possible to reduce a sliding resistance and sliding noise, which occur between the outer circumferential surface 1B of the rack shaft 1 and the first inner circumferential surface 6.

The exemplary embodiment of the present invention is described above. The present invention is not limited to the design illustrated in the drawings, and various changes can be made to the design insofar as the changes do not depart from the scope of the present invention.

What is claimed is:

1. A bush bearing comprising:
   a bush on which a groove is formed along a circumferential direction on an outer circumferential surface of the bush; and
   an endless annular-shaped elastic member which is installed in the groove of the bush,
   wherein an inner circumferential surface of the bush includes a first inner circumferential surface and a second inner circumferential surface,
   the first inner circumferential surface is formed over an angular range greater than 180° about an axial center of the bush,
   the second inner circumferential surface has a diameter larger than that of the first inner circumferential surface,
   the groove has a first part formed in a formation range of the first inner circumferential surface and a second part formed in a formation range of the second inner circumferential surface,
   the first part of the groove has a depth shallower than that of the second part of the groove,
   a first portion of the endless annular-shaped elastic member, is placed on the first part of the groove and has a radial deformation margin larger than that of a second portion of the endless annular-shaped elastic member, which is placed on the second part of the groove, and
   the endless annular-shaped elastic member is in direct contact with an inner circumferential surface of a gear housing and extends along an entire outer circumferential surface of the bush.

2. The bush bearing according to claim 1,
   wherein at least one slit is formed along a direction of an axial center of the bush so as to open at an end portion of the bush in the direction of the axial center of the bush, and
   the at least one slit is disposed in the formation range of the first inner circumferential surface in the angular range about the axial center of the bush.

3. The bush bearing according to claim 2, wherein a plurality of slits are provided.

\* \* \* \* \*